J. C. W. STANLEY.
PROCESS OF TREATING ALKALINE DEPOSITS FOR RECOVERING SODA, &c.
APPLICATION FILED MAY 22, 1907.
No. 900,892.
Patented Oct. 13, 1908.
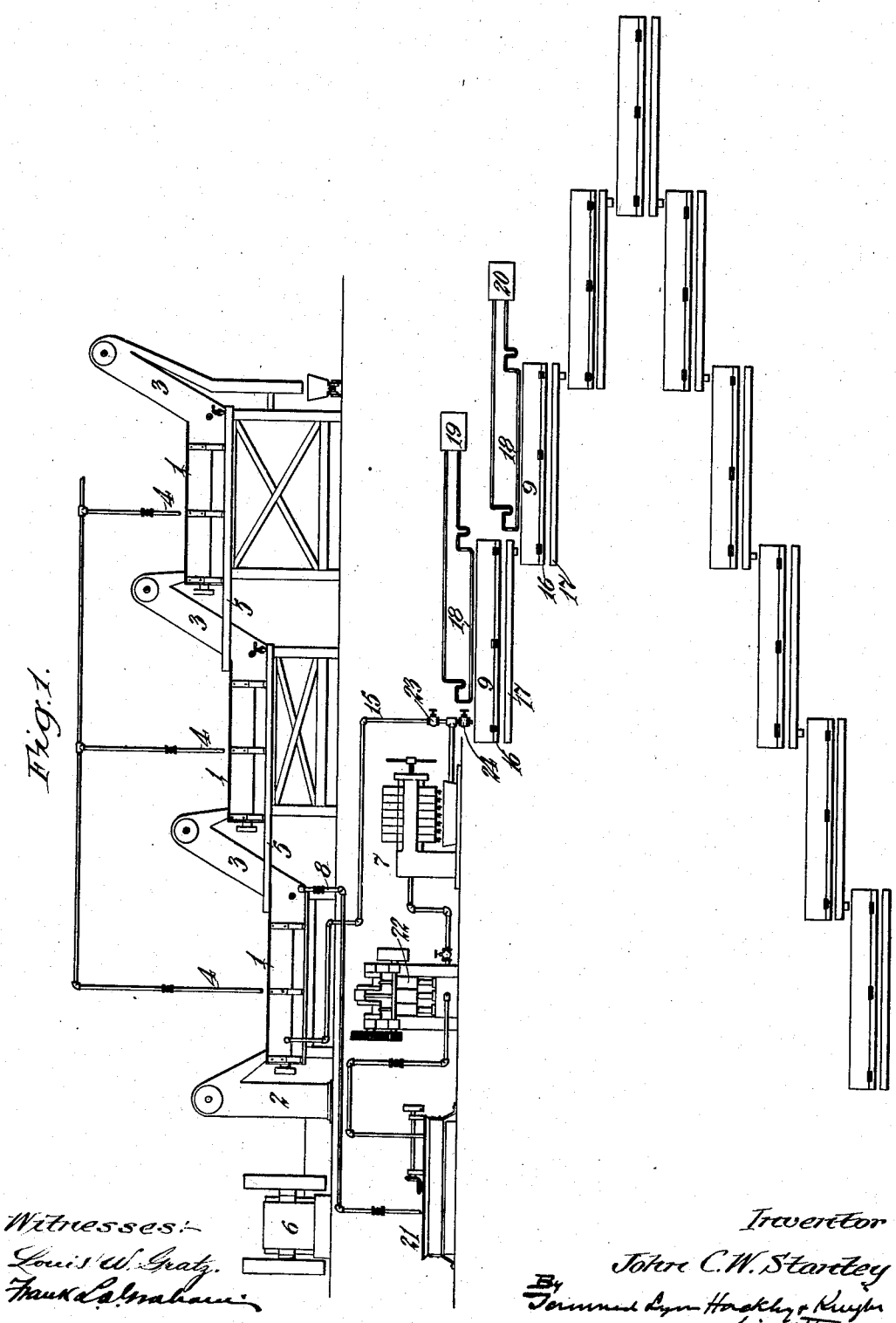

J. C. W. STANLEY.
PROCESS OF TREATING ALKALINE DEPOSITS FOR RECOVERING SODA, &c.
APPLICATION FILED MAY 22, 1907.
900,892.
Patented Oct. 13, 1908.
2 SHEETS—SHEET 2.
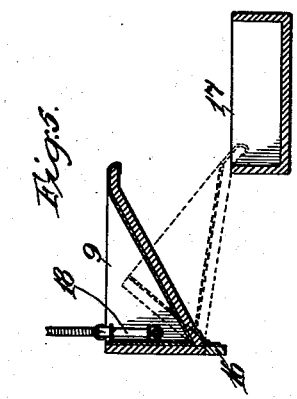
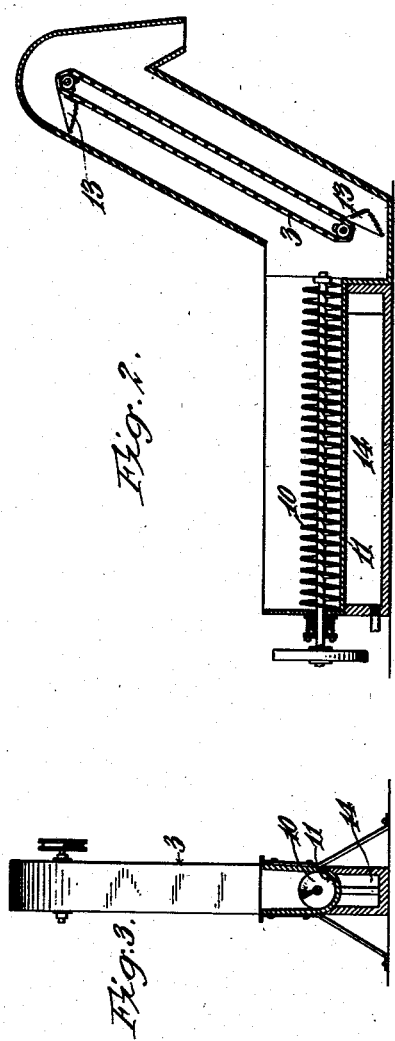
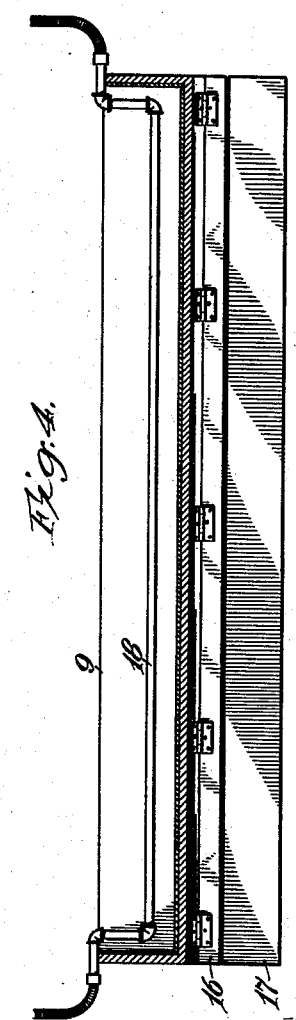

UNITED STATES PATENT OFFICE.

JOHN C. W. STANLEY, OF LOS ANGELES, CALIFORNIA, ASSIGNOR TO PACIFIC COAST SODA COMPANY, OF LOS ANGELES, CALIFORNIA, A CORPORATION OF CALIFORNIA.

PROCESS OF TREATING ALKALINE DEPOSITS FOR RECOVERING SODA, &c.

No. 900,892.  Specification of Letters Patent.  Patented Oct. 13, 1908.

Application filed May 22, 1907. Serial No. 375,174.

*To all whom it may concern:*

Be it known that I, JOHN C. W. STANLEY, a subject of the King of Great Britain and Ireland, residing at Los Angeles, in the county of Los Angeles and State of California, have invented a new and useful Process for Treating Alkaline Deposits for Recovering Soda Products Therefrom, of which the following is a specification.

The main object of the present process is to provide for the recovery of the soluble salts, such as the sulfate, carbonate and nitrate of the alkali metals, from the saline deposits which occur, for example, in the Southwestern United States.

A further object of the present invention is to recover these valuable constituents from such deposits in an economical and expeditious manner and without the use of the expensive and slow process of evaporation in open tanks.

The accompanying drawings illustrate an apparatus suitable for carrying out the process, and referring thereto:—Figure 1 is an elevation, somewhat diagrammatic, showing the series of apparatus through which the material successively passes in the operation. Fig. 2 is a longitudinal section of one of the dissolving tanks. Fig. 3 is a vertical section thereof. Fig. 4 is a longitudinal section of one of the crystallizing tanks. Fig. 5 is a transverse section thereof.

Referring to Fig. 1, the apparatus for carrying out the process comprises a grinding or crushing means 6; a series of dissolving tanks 1; means 2 for supplying material to one end of the first tank; an elevator 3 in connection with each tank for drawing undissolved material from the delivery end thereof to the succeeding tank, or, in case of the last tank of the series, to suitable conveyer means for removing the waste, sand, etc., to a dump; water supply connections 4 for supplying water to each tank; water conveying connections 5 for conveying the water from near the delivery end of each tank to the receiving end of the preceding tank; a filtering apparatus 7; a discharge connection 8 from the first tank through an agitator 21 and a pump 22 to said filter apparatus, and a series of crystallizing tanks 9 to receive the clear liquor from the filter means and to successively separate the alkali or saline constituents therefrom by fractional crystallization.

Each dissolving tank 1 is provided with a conveyer 10, which may be a screw conveyer, working in a correspondingly formed channel 11 in the bottom of the tank, to force the material from the receiving to the delivery end of the tank. The elevator 3 for each tank is provided with drainage or perforate bottom buckets 13, which, in lifting the sand or undissolved material, allow the liquor to strain therethrough and fall back into the tank, except such liquor as may adhere to the solid matter. Heating means, indicated at 14, may be provided for heating one or more of the tanks according to the nature of the material being worked, said heating means preferably operating by direct heat on the bottom of the tank.

The filter means 7 preferably consists of a straining filter. A pipe 15 leads back from this filter to the first tank 1, said pipe having a valve 23, and the discharge connection for the filter to the crystallizing tanks having a valve 24.

Each crystallizing tank 9 is mounted on a fulcrum, as indicated at 16, and is preferably triangular in cross section, so that when it is tipped over to one side, as shown in dotted lines in Fig. 5, the contents will flow over the lip at one side into a launder or discharge trough 17 conveying the liquor to the next stage of the process. A coil 18 is provided in each tank movably supported in such manner that it can be inserted into or drawn from the tank, and means indicated at 19 and 20 are provided for heating or cooling the coils 18 of the respective tanks, as the case may be, according to the requirements of the process as hereinafter set forth.

The process is carried out as follows:—The material is ground so that it will pass through preferably number 14 wire mesh screen and is fed into the first tank 1. According to the analysis of the material, water is added to the material, as it passes into the first tank, to a sufficient amount to readily dissolve the saline content. The insoluble sand and mineral matter precipitates and is carried forward in the tank by the screw conveyer to the delivery end of the tank. The second and third tanks 1 are for washing the sand. The solution in the first tank when it has become thick with the fine mud in suspension is pumped through the filter press, and the clear liquor is returned to the first tank by pipe 15, a further quantity of raw material being added, and this operation is repeated until the solution attains a gravity of 27° Bé., when the liquor is passed to the first crystallizing vats. The liquor in the second tank 1, which will contain a percentage of salines washed from the sand, is transposed to the first tank, the liquor in the third tank is transposed to the second tank and the third tank is supplied with fresh water which passes back eventually to aid in the solution of fresh material in the first tank, and a continual accumulation or increase in the quantity of dissolved material contained in the solution is attained. This operation is repeated in the third tank, the liquor therefrom being returned to the second tank and so on for as many steps as may be necessary to perform complete solution. The final tank of the series will be practically a washing tank to remove the last portions of undissolved material, the residuum of sand, etc., from which the soluble substances have been removed being discharged from the last elevator and carried away by any suitable means. It would not be practicable with raw material of this nature to simply add at one operation the requisite quantity of water for a saturated solution of the salts present, as the mixture would not be workable, the quantity of earth and sand present making the mixture too thick and wasting too much solution by absorption, but by the above described accumulative operation a saturated solution is obtained.

The solution obtained, as above, in the first tank is drawn off therefrom, preferably at or near the delivery end by the pipe connection 8 to filter 7 which separates the slimes or suspended solid matter therefrom, giving a clear solution or liquor, containing the alkaline or saline constituents of the raw material. This liquor is passed to the first crystallizing tank 9 at a density of 27° Bé., and in said tank it is subjected to a cooling operation by lowering the coil 18 thereinto and passing cold brine or other refrigerating agent therethrough until the temperature of the liquor falls to 44° to 50° F. At this temperature the sulfate of soda contained in the liquor will crystallize out. In this crystallization the density of the liquor decreases, so that crystallization ceases before all of the sulfate has been separated. The tank 9 is then tipped over and the liquor decanted off over the lip or side of the tank, running through the trough 17 into the next tank. The crystals adhering to the walls of the tank can then be washed with a spray, the wash water running therefrom in similar manner, and said crystals can then be detached by knocking them from the walls and raking them off into the trough 17 or into any suitable receptacle. The liquor passing to the second tank is heated therein by inserting a coil 18 in said tank and passing heating agent therethrough until the liquor has been evaporated down to 27° Bé., whereupon it is subjected, either in the same tank or in a succeeding tank of the series, to a refrigerating action in a similar manner to the first step and so on for a series of steps until all of the sulfate of soda has been recovered by fractional crystallization. The mother liquor is then again evaporated down to a density of 32° Bé. and therein cooled within the same tank or in a succeeding tank, to 33° F., where the carbonate of soda crystallizes out, the operation being repeated as above until all the carbonate is recovered. The remaining liquor is then boiled, the chlorid of soda being precipitated during the evaporation, and when the boiling point rises to 240° F. this liquor is removed to another tank and nitrate of soda crystallizes out. This separation can be facilitated by reducing the temperature to 44° to 55° F.

What I claim is:—

1. The process for recovery of soluble salines from natural earthy deposits containing sulfate of soda with other salts, which consists in treating the raw material of such deposits with water, removing the solution with suspended mud from the raw material, removing from such liquor the suspended mud, returning the liquor to the raw material, and continuing the operation until a saturated clear solution is obtained, cooling the clear solution to about 44 to 50° F. to cause crystallization of the sulfate of soda, decanting the mother liquor, evaporating to saturation and repeating the crystallization and evaporation until the sulfate of soda is substantially recovered by fractional crystallization.

2. The process for recovery of soluble salines from natural earthy deposits containing sulfate of soda with other salts, which consists in treating the raw material of such deposits with water, removing the solution with suspended mud from the raw material, removing from such liquor the suspended mud, returning the liquor to the raw material, and continuing the operation until a saturated clear solution is obtained, cooling the clear solution to about 44 to 50° F. to cause crystallization of the sulfate of soda, decanting the mother liquor, evaporating to saturation and repeating the crystallization and evaporation until the sulfate of soda is substantially recovered by fractional crystallization, and subsequently evaporating to greater density and separating the carbonate at such greater density and at a temperature of about 33° F., by fractional crystallization.

3. The process for recovery of soluble salines from natural earthy deposits containing sulfate of soda with other salts, which consists in treating the raw material of such deposits with water, removing the solution with suspended mud from the raw material, removing from such liquor the suspended mud, returning the liquor to the raw material, and continuing the operation until a saturated clear solution is obtained, cooling the clear solution to about 44 to 50° F. to cause crystallization of the sulfate of soda, decanting the mother liquor, evaporating to saturation and repeating the crystallization and evaporation until the sulfate of soda is substantially recovered by fractional crystallization, subsequently evaporating to greater density and separating the carbonate at such greater density and at a temperature of about 33° F., by fractional crystallization, and then boiling down the remaining mother liquor to precipitate sodium chlorid.

In testimony whereof, I have hereunto set my hand at Los Angeles, California, this 26th day of April 1907.

JOHN C. W. STANLEY.

In presence of—
FREDERICK S. LYON,
FRANK L. A. GRAHAM